US012721411B2

(12) United States Patent
Wang

(10) Patent No.: US 12,721,411 B2
(45) Date of Patent: Sep. 1, 2026

(54) SUITCASE HANDLE CAPABLE OF DISPLAYING WEIGHT AND SUITCASE THEREWITH

(71) Applicant: WENZHOU KAIERTE HARDWARE CO., LTD., Wenzhou City (CN)

(72) Inventor: Jiansheng Wang, Wenzhou City (CN)

(73) Assignee: WENZHOU KAIERTE HARDWARE CO., LTD., Wenzhou City (CN)

( * ) Notice: Subject to any disclaimer, the term of this patent is extended or adjusted under 35 U.S.C. 154(b) by 0 days.

(21) Appl. No.: 18/985,925

(22) Filed: Dec. 18, 2024

(65) Prior Publication Data

US 2025/0275618 A1 Sep. 4, 2025

(30) Foreign Application Priority Data

Mar. 1, 2024 (CN) ......................... 202410236215.7

(51) Int. Cl.

*A45C 13/28* (2006.01)
*A45C 5/03* (2006.01)
*G01G 21/28* (2006.01)
*G01G 23/26* (2006.01)

(52) U.S. Cl.

CPC ................ *A45C 13/28* (2013.01); *A45C 5/03* (2013.01); *G01G 21/283* (2013.01); *G01G 23/26* (2013.01)

(58) Field of Classification Search

CPC ........ A45C 13/28; A45C 5/03; G01G 21/283; G01G 23/26

See application file for complete search history.

(56) References Cited

U.S. PATENT DOCUMENTS

| | | | | |
|---|---|---|---|---|
| 2,710,083 | A * | 6/1955 | White | G01G 19/58 190/102 |
| 2,759,577 | A * | 8/1956 | White | G01G 19/58 190/102 |
| 2,937,016 | A * | 5/1960 | Westman | G01G 19/00 190/102 |
| 7,378,604 | B2 * | 5/2008 | Truong | A45C 13/28 177/148 |
| 8,485,329 | B1 * | 7/2013 | Roy | G01G 19/58 177/149 |
| 9,080,910 | B1 * | 7/2015 | Zyman Beer | G01G 19/52 |
| 10,145,724 | B2 * | 12/2018 | Guan | A45C 13/28 |

FOREIGN PATENT DOCUMENTS

| | | | | |
|---|---|---|---|---|
| CN | 109924649 A * | 6/2019 | | G01G 19/58 |
| WO | WO-2020215579 A1 * | 10/2020 | | A45C 13/26 |

* cited by examiner

*Primary Examiner* — Tri M Mai
(74) *Attorney, Agent, or Firm* — Hoffmann & Baron, LLP

(57) ABSTRACT

A suitcase handle capable of displaying weight is provided, which includes a grip, a mounting box, a measuring unit arranged in the mounting box, and a display unit arranged on the mounting box. The mounting box is fixed to a body of a suitcase; a first connecting slot is provided on the measuring unit; the grip is connected to the measuring unit by a connecting rod passing through the first connecting slot, and the connecting rod abuts against an edge of the first connecting slot after the grip is lifted and moved for a first distance, so as to exert a pulling force on the measuring unit; a guide slot for guiding the connecting rod is provided on a side of the mounting box; and the guide slot includes an inclined upward section.

11 Claims, 4 Drawing Sheets

SUITCASE HANDLE CAPABLE OF DISPLAYING WEIGHT AND SUITCASE THEREWITH

CROSS-REFERENCE TO RELATED APPLICATION

This patent application claims the benefit and priority of Chinese Patent Application No. 2024102362157 filed with the China National Intellectual Property Administration on Mar. 1, 2024, the disclosure of which is incorporated by reference herein in its entirety as part of the present application.

TECHNICAL FIELD

The present disclosure relates to the technical field of suitcases and in particular to a suitcase handle capable of displaying weight and a suitcase therewith.

BACKGROUND

Major airlines have strict demands on the weight of luggage carried by passengers, and in the past, many passengers only found that their luggage was overweight and needed to consign for shipment just before boarding, resulting in unnecessary expenses. Currently, some suitcases have a function of displaying weight, the principle involves adding a weighing device in a handle, and when the suitcase is lifted, the handle is deformed to activate the weighing device to count so as to complete the weighing. However, the existing weighing handle has the problem of inaccurate weighing, because the handle would be deformed when a hand holds the handle, which would activate the weighing device to count, causing that the weighing device has started counting before the suitcase is lifted, and the final counting result is greater than the actual weight of the suitcase.

SUMMARY

It is an objective of the present disclosure to provide a suitcase handle capable of displaying weight, in order to solve the problem of the above-mentioned prior art, and when the handle is only held by a hand, the weighing device does not count, such that the final count result is equal to the actual weight of the suitcase, ensuring accurate weighing.

The present disclosure also provides a suitcase including a suitcase handle capable of displaying weight described above, and enabling hand-held weighing.

To achieve the above objective, the present disclosure provides the following solutions.

The present disclosure provides a suitcase handle capable of displaying weight, including a grip, a mounting box, a measuring unit arranged in the mounting box, and a display unit arranged on the mounting box, wherein the mounting box is configured to be fixed to a body of a suitcase; a first connecting slot is provided on the measuring unit; the grip is connected to the measuring unit by a connecting rod passing through the first connecting slot, and the connecting rod is configured to abut against an edge of the first connecting slot after the grip is lifted and moved for a first distance, so as to exert a pulling force on the measuring unit; a guide slot for guiding the connecting rod is provided on a side of the mounting box; and the guide slot comprises an inclined upward section, the connecting rod, after moving for the first distance, is located between a bottom end and a top end of the inclined upward section, and a pull gap allowing a hand to pass through is formed between the grip and the body of the suitcase.

Preferably, the guide slot further comprises a horizontal section in communication with the inclined upward section, the horizontal section is adjacent to a bottom of the mounting box, and the connecting rod is configured to be located in the horizontal section before the grip is pulled.

Preferably, the mounting box comprises a mounting base plate and a mounting cover, a transparent window adapted to the display unit and a connecting opening are provided on the mounting cover, the mounting cover covers the measuring unit, and the grip extends through the connecting opening into the mounting box and is connected to the measuring unit.

Preferably, the measuring unit comprises a conversion assembly, a connecting member and a tension spring, which are configured for measurement conversion, wherein the connecting member is provided at one end of the mounting base plate; the connecting member is of a U-shaped structure, and a bottom portion of the connecting member faces an other end of the mounting base plate; each of two sides of the connecting member is provided with the first connecting slot corresponding to the guide slot, and the connecting rod is arranged in the first connecting slots; each of two sides of the connecting member is located between the mounting box and the grip; the bottom portion of the connecting member is hinged to one end of the tension spring, and an other end of the tension spring is fixed to the mounting base plate; and the tension spring is configured to reset the connecting member.

Preferably, the conversion assembly comprises a conversion platform and a conversion rod, wherein a pointer matching the display unit is provided on one side of the conversion platform, and a gear is provide on an other side of the conversion platform; a hollow-out window is provided on the conversion rod, and is sleeved on the gear; a rack meshing with the gear is provide on the hollow-out window; one end of the conversion rod is hinged to the bottom portion of the connecting member; and a conversion rod holder for guiding the conversion rod is provided in the mounting box.

Preferably, the display unit is a dial for displaying a measured value, the pointer is located in a center of the dial, a pointing portion of the pointer corresponds to a scale value on the dial, a zeroing knob for adjusting the pointer into a zero scale position is provided on a top portion of the pointer, a groove is provided on the zeroing knob, a hole matching the zeroing knob is provided on the transparent window, and the zeroing knob is exposed from the transparent window.

Preferably, the grip comprises a holding portion and two connecting portions, wherein the two connecting portions are symmetrically arranged at two ends of the holding portion, respectively and are semi-circular, and a through hole matching the connecting rod is provided in each of the two connecting portions.

Preferably, the mounting box comprises a pair of mounting boxes which are mounted on the suitcase, and the display unit is provided on one of the pair of mounting boxes.

Preferably, the pair of mounting boxes are arranged in a base, and the base is embedded in a suitcase.

The present disclosure also provides a suitcase including a body and a suitcase handle capable of displaying weight described above.

Compared with the conventional art, the present disclosure has the following technical effects.

In a suitcase handle capable of displaying weight provided by some embodiments, when a suitcase placed on the ground needs to be lifted for weighing, the deformation of the handle caused by a hand holding the handle causes the movement of the connecting rod, the first connecting slots can provide a movement space for the connecting rod so as to prevent the connecting rod from directly driving the connecting member to translate, the guide slot guides the connecting rod, and converts a transverse movement of the connecting rod into an oblique movement, during which the measuring unit does not count, and when the suitcase is lifted, the connecting rod comes in contact with the connecting member and drives the connecting member to move, enabling the measuring unit to count, thereby ensuring the accuracy of a weighing result.

The suitcase provided by the present disclosure includes a suitcase handle capable of displaying weight described above, and has a corresponding technical effect, which will not be described in detail here.

BRIEF DESCRIPTION OF THE DRAWINGS

To illustrate the technical solutions in the embodiments of the present disclosure or conventional art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

LIST OF REFERENCE SIGNS

1 grip; 2 mounting box; 3 first connecting slot; 4 connecting rod; 5 guide slot; 6 mounting base plate; 7 mounting cover; 8 connecting opening; 9 transparent window; 10 snap-fit fastener, 11 snap-fit hole; 12 connecting member; 13 tension spring; 14 hollow rod; 15 vertical rod; 16 conversion platform; 17 conversion rod; 18 pointer; 19 gear; 20 hollow-out window; 21 vertical limiting portion; 22 horizontal limiting portion; 23 dial; 24 zeroing knob; 25 holding portion; 26 connecting portion; 27 base.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the embodiments described are merely some rather than all of the embodiments of the present disclosure. Based on the embodiments in the present disclosure, all the other embodiments that would have been obtained by those of ordinary skill in the art without any inventive effort shall fall within the scope of protection of the present disclosure.

It is an objective of the present disclosure to provide a suitcase handle capable of displaying weight, in order to solve the problem of the above-mentioned prior art, and when the handle is only held by a hand, the weighing device does not count, such that the final count result is equal to the actual weight of the suitcase, ensuring accurate weighing.

The present disclosure provides a suitcase including a body and the suitcase handle capable of displaying weight described above, and having the technical effect that can be achieved by the suitcase handle capable of displaying weight described above.

To make the above objective, features and advantages of the present disclosure clearer and more comprehensible, the present disclosure is further described in detail below with reference to the accompanying drawings and specific implementations.

Figure 1:
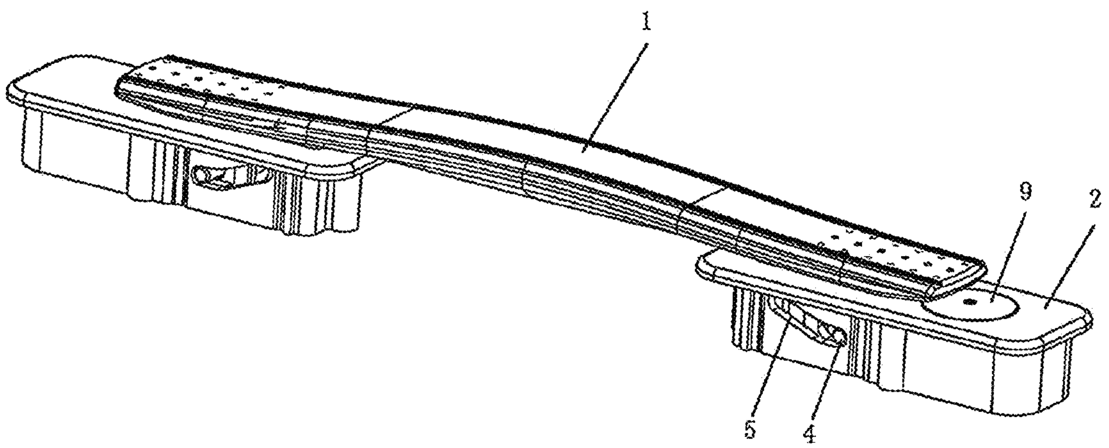
FIG. 1 is a schematic diagram of an overall structure of a suitcase handle capable of displaying weight according to an embodiment of the present disclosure.
Figure 2:
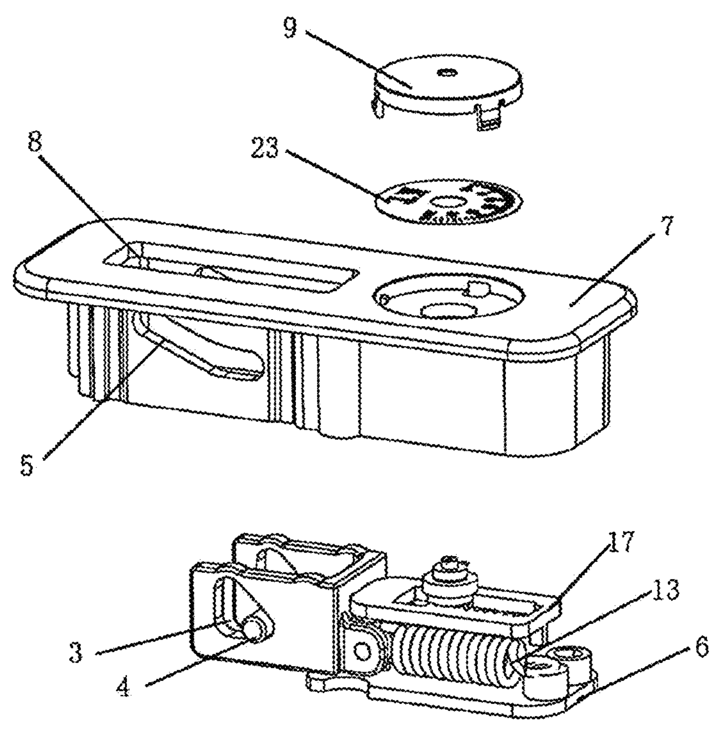
FIG. 2 is a schematic exploded structural diagram of a mounting box and a measuring unit according to an embodiment of the present disclosure.
Figure 3:
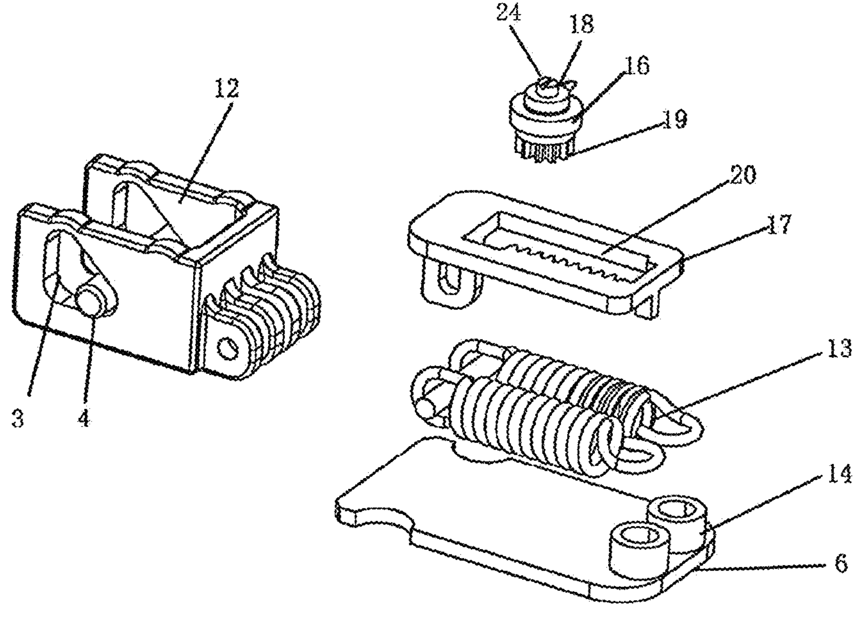
FIG. 3 is a schematic structural diagram of a measuring unit according to an embodiment of the present disclosure.

The present disclosure provides a suitcase handle capable of displaying weight, as shown in FIGS. 1-3, including a grip 1, a mounting box 2, a measuring unit arranged in the mounting box, and a display unit arranged on the mounting box. The mounting box 2 is fixed to a body of a suitcase. A first connecting slot 3 is provided on the measuring unit. The grip 1 is connected to the measuring unit by means of a connecting rod 4 passing through the first connecting slot 3, and the connecting rod 4 abuts against an edge of the first connecting slot 3 after the grip 1 is lifted and moved for a first distance, so as to exert a pulling force on the measuring unit. A guide slot 5 for guiding the connecting rod is provided on a side of the mounting box 2. The guide slot 5 includes an inclined upward section, the connecting rod 4, after moving for the first distance, is located between a bottom end and a top end of the inclined upward section, and a pull gap allowing a hand to pass through is formed between the grip 1 and the body of the suitcase. In a preferred embodiment, the guide slot 5 further includes a horizontal section in communication with the inclined upward section. The horizontal section is adjacent to the bottom of the mounting box, and the connecting rod is located in the horizontal section before the grip is pulled. When the handle 1 is released, the connecting rod 4 should return to the horizontal section. A user can simply determine the reliability of the measuring unit by means of the position of the connecting rod 4, so as to check and repair the measuring unit which may be in problem.

Figure 4:
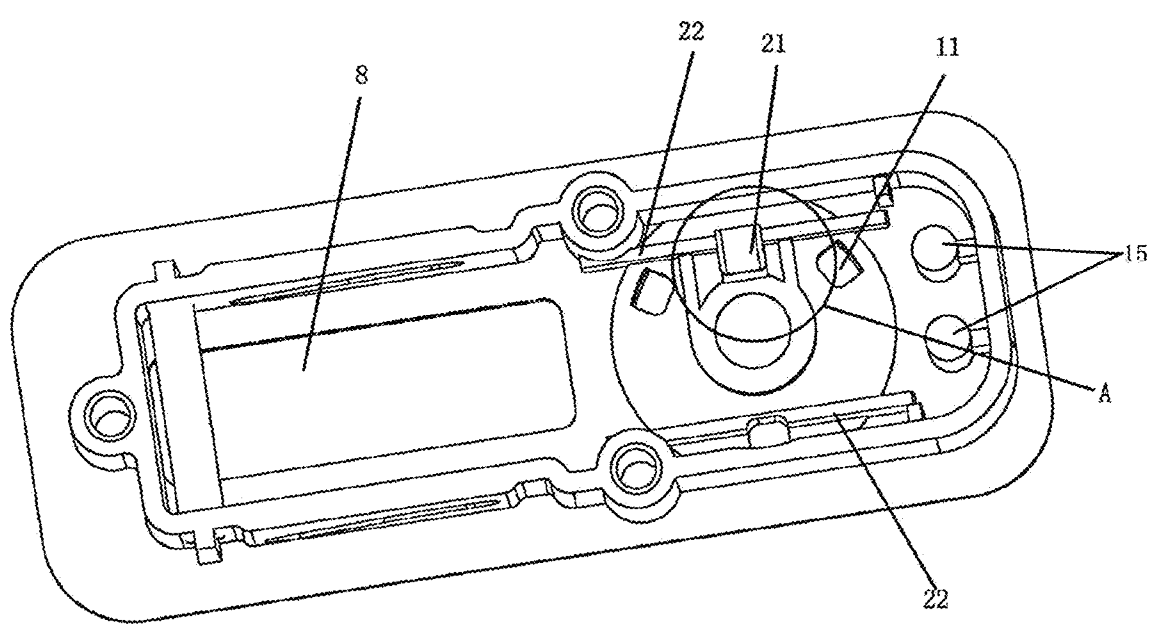
FIG. 4 is a schematic diagram of an internal structure of a mounting cover according to an embodiment of the present disclosure.

As shown in FIG. 2, in an embodiment, the mounting box 2 includes a mounting base plate 6 and a mounting cover 7. A connecting opening 8 and a transparent window 9 which is adapted to the display unit are provided on the mounting cover 7. The mounting cover 7 covers the measuring unit. The grip 1 extends through the connecting opening 8 into the mounting box 2 and is connected to the measuring unit. As shown in FIGS. 2 and 4, in a preferred embodiment, the transparent window 9 is snap-fitted onto the mounting box 2. Specifically, a snap-fit fastener 10 is provided on a bottom portion of the transparent window 9, and a snap-fit hole 11 matching the snap-fit fastener 10 is provided on the mounting box 2. The snap-fit structure is simple and securely mounted, such that the transparent window 9 is less prone to falling off in the process of taking and placing the suitcase.

As shown in FIG. 3, in an embodiment, the measuring unit includes a conversion assembly, a connecting member 12 and a tension spring 13, which are configured for measurement conversion. The connecting member 12 is provided at one end of the mounting base plate 6. The connecting member 12 is of a U-shaped structure, and a bottom portion of the connecting member 12 faces the other end of the mounting base plate 6. A set of the first connecting slots 3 corresponding to the guide slots 5 are arranged on two sides of the connecting member 12, and the connecting rod 4 is arranged in the first connecting slots 3. The side of the connecting member 12 is located between the mounting box 2 and the grip 1. The first connecting slot 3 is preferably triangular and can function to provide a movement space for the connecting rod 4. When the grip 1 is held by a hand, the connecting rod 4 is driven by the grip 1 to move in the first connecting slots 3, during which the connecting rod 4 does not come into contact with the connecting member 12, without causing the measuring unit to count. The bottom portion of the connecting member 12 is hinged to one end of the tension spring 13, and the other end of the tension spring 13 is fixed to the mounting base plate 6. The tension spring 13 is configured to reset the connecting member. As shown in FIGS. 3 and 4, in a preferred embodiment, a hollow rod 14 is provided at an end of the mounting base plate 6 for fixing the tension spring 13, a vertical rod 15 matching the hollow rod is provided on an inner side of the mounting cover 7, and an end portion of the tension spring 13 is limited by the vertical rod 15. The end portion of the tension spring 13 may also be directly hung on an inner wall of the mounting cover 7 or hinged to the mounting base plate 6.

Figure 5:
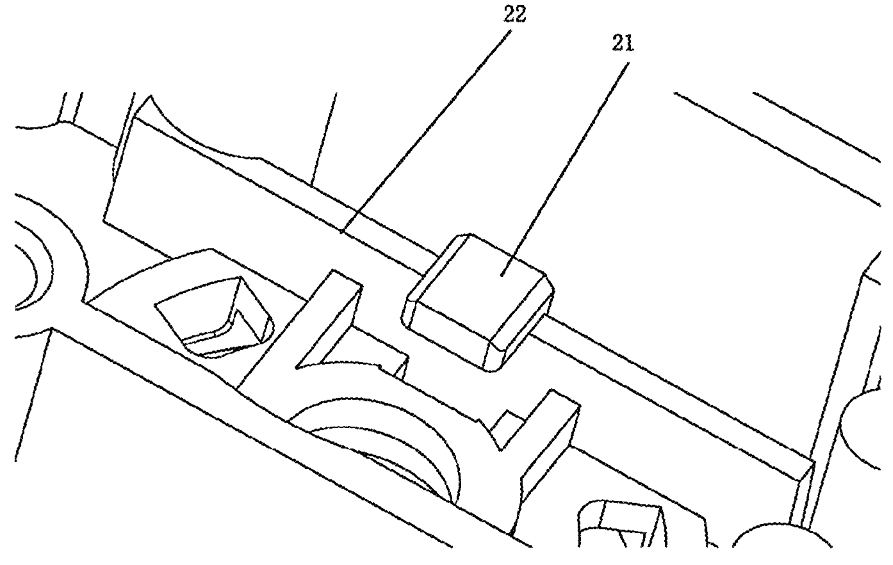
FIG. 5 is an enlarged view of portion A in FIG. 4.

As shown in FIG. 3, in an embodiment, the conversion assembly includes a conversion platform 16 and a conversion rod 17. A pointer 18 matching the display unit is provided on one side of the conversion platform 16, and a gear 19 is provide on the other side of the conversion platform 16. A hollow-out window 20 is provided on the conversion rod 17, and is sleeved on the gear 19. A rack meshing with the gear is provided on the hollow-out window. One end of the conversion rod 17 is hinged to the bottom portion of the connecting member 12. A conversion rod holder for guiding the conversion rod 17 is provided in the mounting box. As shown in FIGS. 4 and 5, the conversion rod holder includes a vertical limiting portion 21 and a horizontal limiting portion 22, the conversion rod 17 extends between the vertical limiting portion 21 and the mounting cover 7, the conversion rod 17 is limited from being tilted upwards in a vertical direction, and the horizontal limiting portion 22 limits the conversion rod 17 from swinging left and right in a horizontal direction.

As shown in FIG. 2, in an embodiment, the display unit is a dial 23 for displaying a measured value, and the pointer 18 is located in the center of the dial 23. A pointing portion of the pointer 18 corresponds to a scale value on the dial 23. A zeroing knob 24 for adjusting the pointer into a zero scale position is provided on a top portion of the pointer 18. A groove is provided on the zeroing knob 24, a hole matching the zeroing knob 24 is provided on the transparent window 9, and the zeroing knob 24 is exposed from the transparent window 9. The groove may be in the shape of a straight line, a cross, a hexagon socket, etc. which can be rotated by a conventional screwdriver.

Figure 6:
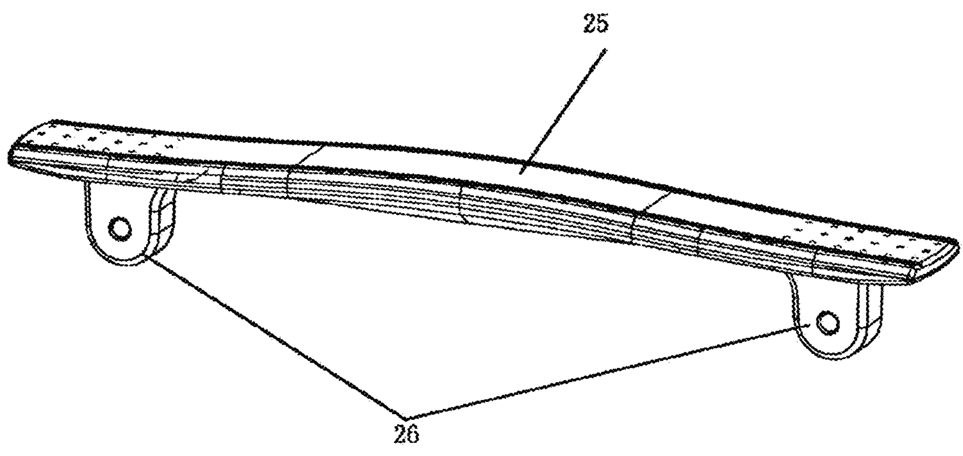
FIG. 6 is a schematic structural diagram of a handle according to an embodiment of the present disclosure.
Figure 7:
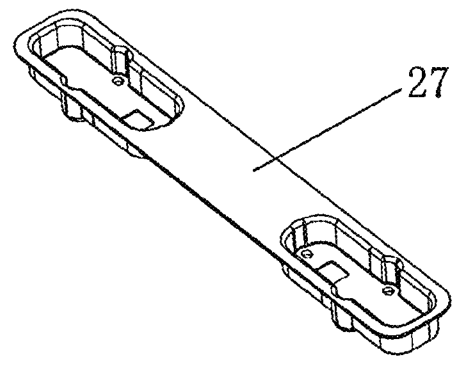
FIG. 7 is a schematic structural diagram of a base according to an embodiment of the present disclosure.

As shown in FIG. 6, in an embodiment, the grip 1 includes a holding portion 25 and a connecting portion 26. The connecting portion 26 is symmetrically arranged at two ends of the holding portion 25. The connecting portion 26 may be semi-circular. A through hole matching the connecting rod 4 is provided in the connecting portion 26. The connecting portion 26 may further be of a different shape enabling the connecting function.

As shown in FIG. 1, a pair of mounting boxes 2 are mounted on the suitcase, and the display unit is provided on one of the mounting boxes 2. In a preferred embodiment, the mounting boxes 2 are arranged in a base 27. The base 27 is embedded in the suitcase, and the base 27 can further fix the mounting boxes 2 and protect the mounting boxes 2.

When a suitcase placed on the ground needs to be lifted for weighing, the deformation caused by a hand holding the handle 1 causes the movement of the connecting rod 4, the first connecting slots 3 can provide a movement space for the connecting rod 4 so as to prevent the connecting rod 4 from directly driving the connecting member 12 to translate, the guide slot 5 guides the connecting rod 4, and converts a transverse movement of the connecting rod 4 into an oblique movement, during which the measuring unit does not count, and when the suitcase is lifted, the connecting rod 4 comes in contact with the connecting member 12 and drives the connecting member 12 to move, enabling the measuring unit to count, thereby ensuring the accuracy of a weighing result.

An upper limit of measurement of the suitcase handle capable of displaying weight of the present disclosure is determined by the guide slot 5. Specifically, when the connecting rod 4 abuts against the top edge of the guide slot 5, the extension of the tension spring 13 reaches a maximum, what the display unit displays is the maximum measured value, and even if the weight of the suitcase exceeds the value of the display unit, the connecting rod 4 would be limited by the guide slot 5, preventing the tension spring 13 from being further extended, thereby functioning to protect the tension spring 13. The value of the upper limit of measurement is determined by a length and an angle of inclination of the guide slot 5, and if the guide slot 5 has a longer length and a greater angle of inclination, the upper limit of measurement is higher.

The present disclosure also provides a suitcase including a body and the suitcase handle capable of displaying weight described above, and having the technical effect that can be achieved by the suitcase handle capable of displaying weight described above, which will not be described in detail herein.

In the present disclosure, the principle and embodiments of the present disclosure are described herein by using specific examples, the above descriptions of the embodiments are merely intended to help understand the methods and core idea of the present disclosure. In addition, for those of ordinary skill in the art, changes may be made to the specific embodiments and the scope of application according to the concept of the present disclosure. In summary, the content of the description should not be construed as a limitation to the present disclosure.

What is claimed is:

1. A suitcase handle capable of displaying weight, comprising a grip, a mounting box, a measuring unit arranged in the mounting box, and a display unit arranged on the mounting box, wherein the mounting box is configured to be fixed to a body of a suitcase; a first connecting slot is provided on the measuring unit; the grip is connected to the measuring unit by a connecting rod passing through the first connecting slot, and the connecting rod is configured to abut against an edge of the first connecting slot after the grip is lifted and moved for a first distance, so as to exert a pulling force on the measuring unit; a guide slot for guiding the connecting rod is provided on a side of the mounting box; and the guide slot comprises an inclined upward section, the connecting rod, after moving for the first distance, is located between a bottom end and a top end of the inclined upward section, and a pull gap allowing a hand to pass through is formed between the grip and the body of the suitcase; wherein the mounting box comprises a mounting base plate and a mounting cover, a transparent window adapted to the display unit and a connecting opening are provided on the mounting cover, the mounting cover covers the measuring unit, and the grip extends through the connecting opening into the mounting box and is connected to the measuring unit;

wherein the measuring unit comprises a conversion assembly, a connecting member and a tension spring, which are configured for measurement conversion, wherein the connecting member is provided at one end of the mounting base plate; the connecting member is of a U-shaped structure, and a bottom portion of the connecting member faces an other end of the mounting base plate; each of two sides of the connecting member is provided with the first connecting slot corresponding to the guide slot, and the connecting rod is arranged in the first connecting slots; each of two sides of the connecting member is located between the mounting box and the grip; the bottom portion of the connecting member is hinged to one end of the tension spring, and an other end of the tension spring is fixed to the mounting base plate; and the tension spring is configured to reset the connecting member;

wherein the conversion assembly comprises a conversion platform and a conversion rod, wherein a pointer matching the display unit is provided on one side of the conversion platform, and a gear is provide on an other side of the conversion platform; a hollow-out window is provided on the conversion rod, and is sleeved on the gear; a rack meshing with the gear is provide on the hollow-out window; one end of the conversion rod is hinged to the bottom portion of the connecting member; and a conversion rod holder for guiding the conversion rod is provided in the mounting box.

2. The suitcase handle capable of displaying weight according to claim 1, wherein the guide slot further comprises a horizontal section in communication with the inclined upward section, the horizontal section is adjacent to a bottom of the mounting box, and the connecting rod is configured to be located in the horizontal section before the grip is pulled.

3. The suitcase handle capable of displaying weight according to claim 2, wherein the mounting box comprises a pair of mounting boxes which are mounted on the suitcase, and the display unit is provided on one of the pair of mounting boxes.

4. A suitcase, comprising a body and the suitcase handle capable of displaying weight according to claim 2.

5. The suitcase handle capable of displaying weight according to claim 1, wherein the display unit is a dial for displaying a measured value, the pointer is located in a center of the dial, a pointing portion of the pointer corresponds to a scale value on the dial, a zeroing knob for adjusting the pointer into a zero scale position is provided on a top portion of the pointer, a groove is provided on the zeroing knob, a hole matching the zeroing knob is provided on the transparent window, and the zeroing knob is exposed from the transparent window.

6. The suitcase handle capable of displaying weight according to claim 5, wherein the mounting box comprises a pair of mounting boxes which are mounted on the suitcase, and the display unit is provided on one of the pair of mounting boxes.

7. The suitcase handle capable of displaying weight according to claim 1, wherein the grip comprises a holding portion and two connecting portions, wherein the two connecting portions are symmetrically arranged at two ends of the holding portion, respectively and are semi-circular, and a through hole matching the connecting rod is provided in each of the two connecting portions.

8. The suitcase handle capable of displaying weight according to claim 7, wherein the mounting box comprises a pair of mounting boxes which are mounted on the suitcase, and the display unit is provided on one of the pair of mounting boxes.

9. The suitcase handle capable of displaying weight according to claim 1, wherein the mounting box comprises a pair of mounting boxes which are mounted on the suitcase, and the display unit is provided on one of the pair of mounting boxes.

10. The suitcase handle capable of displaying weight according to claim 9, wherein the pair of mounting boxes are arranged in a base, and the base is embedded in a suitcase.

11. A suitcase, comprising a body and the suitcase handle capable of displaying weight according to claim 1.

* * * * *